(12) United States Patent
Vorderwülbecke

(10) Patent No.: US 9,734,154 B2
(45) Date of Patent: Aug. 15, 2017

(54) METHOD AND APPARATUS FOR STORING A DATA FILE

(71) Applicant: Laurenz Vorderwülbecke, Karlsruhe (DE)

(72) Inventor: Laurenz Vorderwülbecke, Karlsruhe (DE)

(*) Notice: Subject to any disclaimer, the term of this patent is extended or adjusted under 35 U.S.C. 154(b) by 264 days.

(21) Appl. No.: 14/565,346

(22) Filed: Dec. 9, 2014

(65) Prior Publication Data
US 2015/0169561 A1 Jun. 18, 2015

(30) Foreign Application Priority Data
Dec. 18, 2013 (EP) .................................. 13198124

(51) Int. Cl.
*G06F 17/30* (2006.01)
*G06F 11/10* (2006.01)
*H04L 9/08* (2006.01)
*H04L 29/08* (2006.01)

(52) U.S. Cl.
CPC ...... *G06F 17/3007* (2013.01); *G06F 11/1076* (2013.01); *H04L 9/085* (2013.01); *G06F 2211/1028* (2013.01); *H04L 67/1097* (2013.01)

(58) Field of Classification Search
CPC ............ G06F 17/30067; G11B 27/105; G11B 27/329
USPC .............................. 707/821; 705/44; 708/250
See application file for complete search history.

(56) References Cited

U.S. PATENT DOCUMENTS

| | | | |
|---|---|---|---|
| 4,315,309 A * | 2/1982 | Coli ...................... | G06F 19/322 705/3 |
| 6,418,435 B1 * | 7/2002 | Chase .................. | G06F 17/2775 |
| 8,812,570 B2 * | 8/2014 | Schneider ............. | H04L 9/0643 708/250 |
| 2003/0007635 A1 * | 1/2003 | Li .......................... | H04L 9/001 380/28 |
| 2006/0149674 A1 * | 7/2006 | Cook ..................... | G06Q 20/40 705/44 |

(Continued)

FOREIGN PATENT DOCUMENTS

| | | |
|---|---|---|
| JP | 2013102526 | 5/2013 |
| WO | 2004057461 | 7/2004 |

OTHER PUBLICATIONS

European Patent Office; EPO Extended Search Report EP patent No. 13198124.3; Jul. 2, 2014; 8 pages.

(Continued)

*Primary Examiner* — Jeffrey A Burke
*Assistant Examiner* — Thong Vu
(74) *Attorney, Agent, or Firm* — IP Spring

(57) ABSTRACT

Implementations relate to storing a data file in data storages. In some implementations, a method for storing a data file in n data storages includes dividing the data file into data file parts such that at least n−1 data file parts are equal in size, and for each n−1 data file part, combining the n−1 data file parts by XOR to obtain a first data file result. The method deranges the first data file result and combines each of n−2 data file parts of the n−1 data file parts and the deranged first data file result by XOR to obtain second data file results. The method combines the first data file result and the second data file results by XOR to obtain a third data file result, and stores each of the first, second and third data file results in one of the n data storages.

20 Claims, 4 Drawing Sheets

(56) References Cited

U.S. PATENT DOCUMENTS

| | | | |
|---|---|---|---|
| 2009/0204859 A1* | 8/2009 | Cousins | G06F 11/1004 714/701 |
| 2012/0237020 A1* | 9/2012 | Pruss | H04L 9/0631 380/28 |
| 2012/0255030 A1 | 10/2012 | Matsuo | |
| 2013/0205123 A1* | 8/2013 | Vorbach | G06F 9/30043 712/221 |

OTHER PUBLICATIONS

EPO, "Communication pursuant to Article 94(3) EPC in European Application No. 13198124.3", Jan. 3, 2017.

\* cited by examiner

METHOD AND APPARATUS FOR STORING A DATA FILE

BACKGROUND

In general, cloud computing is the use of computing resources, i.e., hardware and software, which are available at a remote location and accessible over a network such as the Internet. In particular, one example of cloud computing is a cloud storage which refers to an online space used by users to store data files. In other words, data is stored remotely.

In a cloud storage, a cloud storage service provider provides a certain cloud storage resource as required by a user to store data files. From the perspective of the user, storing data files in a cloud storage is however mostly nontransparent in terms of the actual storing conditions, since the user usually does not know at which location, at which storage device, and under which further technical, legal and other conditions, etc. the data files are actually stored. Specifically, it depends on the cloud storage service provider whether backups, redundancy, and/or data security is provided. Usually, the data files are stored in the cloud storages in clear text.

The users entrust the data files to the cloud service provider. However, a user usually cannot directly determine, influence or control the actual cloud storage device and the storage conditions at which the data files are stored. Furthermore, in case of insolvency of the cloud storage provider, the data files of the users may not be accessible any further, and therefore lost. Moreover, hackers or foreign intelligences may have or get access to the data files.

Therefore, there is a need in the art to address the problem associated with existing cloud storage solutions. For example, data security and privacy in view of the data files of the users is needed, irrespective of whether the data files are stored locally or on a cloud storage of any cloud storage service provider.

SUMMARY

According to an aspect, a method for storing a data file in n data storages, n being an integer equal to or greater than 3 comprises: dividing the data file into a plurality of data file parts such that n−1, or a multiple thereof, data file parts of the plurality of data file parts are equal in size; and for each of the n−1 data file parts being equal in size, combining the n−1 data file parts by XOR to obtain a first data file result, deranging the first data file result to obtain a deranged first data file result, combining each of n−2 data file parts of the n−1 data file parts and the deranged first data file result by XOR to obtain second data file results, combining the first data file result and the second data file results by XOR to obtain a third data file result, and storing each of the first, second and third data file results in one of the n data storages.

According to this aspect, problems of the background art can be overcome. In particular, part of the content of the data files is stored in each of the data storages, so that even in case of an unauthorized access to one of said data storages the content of the data files neither is accessible nor restorable. In case of unauthorized access to one of said data storages, only information will become accessible which relate to part of the content of the data file only but solely from which the part of the content of the data file cannot be restored. Furthermore, even in case one of the data storages in which part of the content of the data file is stored becomes faulty, the entire content of the data file can be restored.

According to another aspect, the method further comprises, before the dividing, checking whether a number of bytes in the data file is a multiple of n−1 and if not, transforming the data file such that the number of byte is a multiple of n−1. Accordingly, it can be achieved that the data file can be divided into n−1 data file parts being equal in size. In one example, the transforming the data file includes adding bytes to the data file until the number of bytes is a multiple of n−1. With this operation, byte-wise operations on the data file such as the dividing can be performed.

According to another aspect, the method further comprises, before the dividing, compressing the data file. In one example, the compressing the data file can comprise: randomly selecting a predetermined number of bytes from the data file; determining a number of bytes having a value of zero among the predetermined number of bytes; and if the number of bytes having a value of zero exceeds a predetermined threshold value, compressing the data file with respect to bytes of the data file having a value of zero.

In one example, the deranging the first data file part can comprise shifting the first data file result by a predetermined number of bits.

According to another aspect, the method further comprises encrypting the data file and/or each of the first, second and third data file results with an encryption algorithm.

Other aspects of the present invention relate to an apparatus for storing a data file in a number of data storages, a computer program, and a non-transitory computer-readable recording medium.

According to a further aspect, an apparatus for storing a data file in n data storages, n being an integer equal to or greater than 3, comprises: a dividing module configured to divide the data file into a plurality of data file parts such that n−1, or a multiple thereof, data file parts of the plurality of data file parts are equal in size; a first combining module configured to combine, for each n−1 data file parts being equal in size, the n−1 data file parts by XOR to obtain a first data file result, a deranging module configured to derange the first data file result to obtain a deranged first data file result, a second combining module configured to combine each of n−2 data file parts of the n−1 data file parts and the deranged first data file result by XOR to obtain second data file results, a third combining module configured to combine the first data file result and the second data file results by XOR to obtain a third data file result, and a storing module configured to store each of the first, second and third data file results in one of the n data storages.

According to another aspect, the apparatus further comprises a transforming module configured to check whether a number of bytes in the data file is a multiple of n−1 and if not, transform the data file such that the number of byte is a multiple of n−1. The transforming module may further be configured to add bytes to the data file until the number of bytes is a multiple of n−1.

According to yet another aspect, the apparatus further comprises a compressing module configured to compress the data file. The compressing module may be configured to randomly select a predetermined number of bytes from the data file, determine a number of bytes having a value of zero among the predetermined number of bytes, and if the number of bytes having a value of zero exceeds a predetermined threshold value, compress the data file with respect to bytes of the data file having a value of zero.

The deranging module may, according to one aspect, comprise a shifting module configured to shift the first data file result by a predetermined number of bits. Additionally or alternatively, the apparatus may further comprise an encryption module configured to encrypt the data file and/or each of the first, second and third data file results with an encryption algorithm.

According to another aspect, a computer program which when executed on a computer causes the computer to perform operations similar to the above methods. The computer program may be stored on a non-transitory computer-readable recording medium.

BRIEF DESCRIPTION OF THE DRAWINGS

The drawings accompanying and forming part of this specification are included to depict example implementations of described features. A clearer impression of the features, and of the components and operation of described systems, will become more readily apparent by referring to the non-limiting example implementations illustrated in the drawings, wherein identical reference numerals designate the same components. Note that the features illustrated in the drawings are not necessarily drawn to scale.

DETAILED DESCRIPTION

Various features and advantageous details thereof are explained more fully with reference to the non-limiting implementations that are illustrated in the accompanying drawings and detailed in the following description.

Descriptions of well-known processing techniques, components and equipment are omitted so as not to unnecessarily obscure the described features in detail. It should be understood, however, that the detailed description and the specific examples are given by way of illustration only and not by way of limitation. Various substitutions, modifications, additions and/or rearrangements within the spirit and/or scope of the underlying concepts will become apparent to those skilled in the art from this disclosure.

Implementations discussed herein can be implemented in suitable computer-executable instructions that may reside on a computer readable medium (e.g., a hard disk drive (HDD)), hardware circuitry or the like, or any combination.

Figure 1:
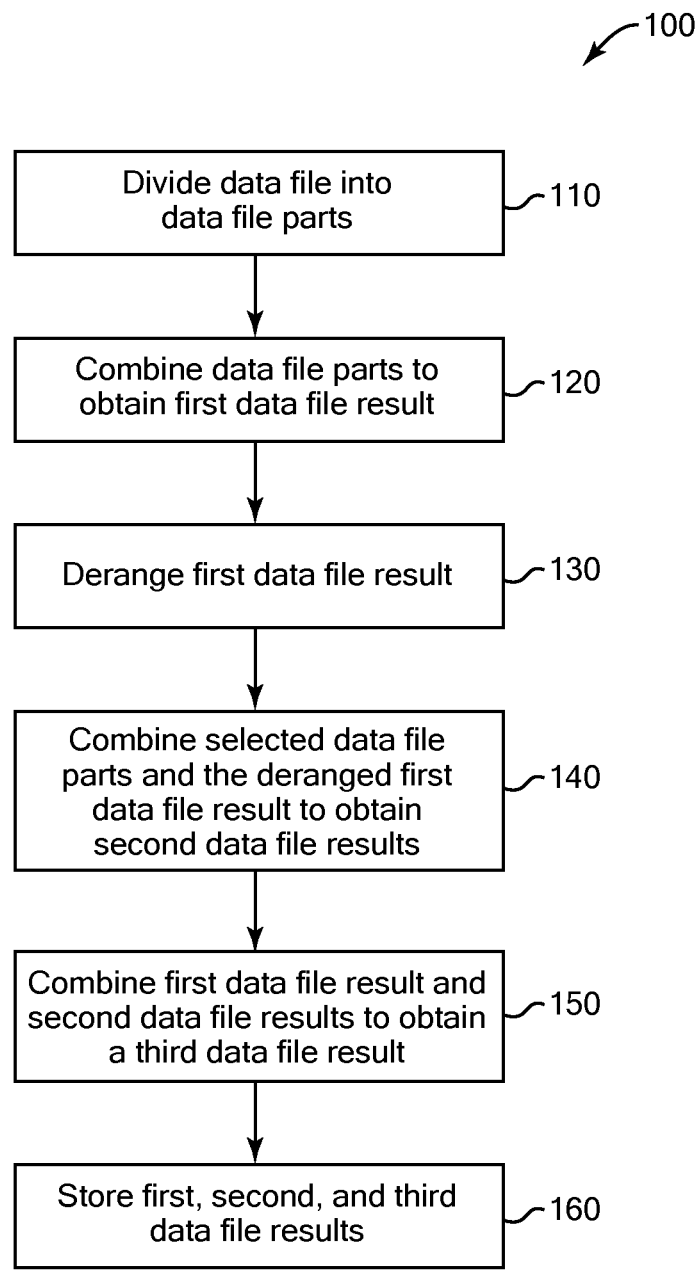
FIG. 1 is a simplified flow chart of an example method for storing a data file in a number of data storages, in accordance with some implementations.

FIG. 1 is a simplified flow chart of a method 100 for storing a data file in a number of data storages, in accordance with some implementations. The number of the data storages is n, n being an integer equal to or greater than three. Preferably, the number of the data storages is equal to three. However, the method 100 according to some implementations in which the number of the data storages is equal to or greater than three, will now be described in more detail with reference to FIG. 1.

The data file may be any type of electronic or machine-readable data file such as a text file, a multimedia file (e.g., image, video, music, or the like), or a file including other information. For example, the data file may be a text document in the Open Document Format or the Portable Document Format.

The data storages may be any type of storages such as local storages, network storages and cloud storages, or combinations thereof. Local storages relate to any type of storages connected, using a wired or wireless connection, to a computer or processing device such as a smartphone, a tablet, or the like. Examples for local storages include hard disk drives (HDD), Solid State Drives (SSD), any kind of memory cards such as a Secure Digital High Capacity (SDHC) card, or the like. The local storage may be connected to the computer or the processing device through Universal Serial Bus (USB), FireWire, Serial Advanced Technology Attachment (S-ATA), or the like. Network storages relate to any type of storages connected, directly or via a server, to a network such as a Local Area Network (LAN) and accessible by the computer or processing device via the network. Examples for network storages include Network Attached Storages (NAS) or hard disk drives connected to the network server and shared with the computer or the processing device in the network, e.g., using network protocols such as Server Message Block (SMB), File Transfer Protocol (FTP), or the like. Cloud storages relate to a model of networked Enterprise storages where data is stored in virtualized pools of storage which are generally hosted by third parties. Examples of cloud storages are DropBox, iCloud, or the like.

The method 100 starts at block 110. In block 110, the data file is divided into a plurality of data file parts. That is, irrespective of the content or type of the data file, the data file is divided in the data file parts, byte-wise, bit-wise, or in any other suitable fashion. The data file may be divided such that n−1, or a multiple thereof, data file parts are equal in size. For example, assuming that the division is made byte-wise, that the number of data storages is three, i.e., n=3, and that the data file to be divided has a size of 12 byte, the data file is divided in two, i.e., n−1, data file parts each having a size of 6 bytes. Also, the data file may be divided in four data file parts each having a size of 3 bytes. However, as will be appreciated by one of ordinary skill, the number of data file parts into which the data file is divided may be n−1 or more, as far as n−1 data file parts are equal in size.

The blocks 120 to 160 are then performed for each n−1 data file parts being equal in size. That is, in the above example, the blocks 120 to 160 are performed for the three data file parts each having a size of 2 bytes, or for each combination of three data file parts among the four data file parts each having a size of 3 bytes.

Firstly, in block 120, the n−1 data file parts are combined to obtain a first data file result. The data file parts may be combined in block 120 by an eXclusive OR (XOR) operation. However, as it will be appreciated by one of ordinary skill, other operations for combining two inputs to one output may be used, instead of the XOR operation, as far as they are reversible. For example, in block 120, a first data file part "10011100" and a second data file part "01101100" are combined by XORing, resulting in a first data file result "11110000".

Then, in block 130, the first data file result is deranged to obtain a deranged first data file result. Deranging is, for example, known in the combinatorial mathematics as being a permutation of the elements of a set such that none of the elements appear in their original position.

One example of deranging is a bit shift by a predetermined number of bits. Preferably, circular shift or bit rotation is used to derange. According to circular shift or bit rotation, the bits are "rotated" as if the left and right ends of, e.g., a register were joined. The value that is shifted in on the right during a left-shift is whatever value was shifted out on the left, and vice versa. In the above example, the first data file result "11110000" may be circularly shifted by one bit to the left, resulting in the deranged first data file result "11100001".

Another example of deranging is a Substitution-box (S-Box). In general, an S-Box takes some number of input bits and transforms them into some number of output bits, where the number of output bits is not necessarily equal to the number of input bits. An S-Box may be implemented as a lookup table with a number of words corresponding to two raised to the power of the number of input bits, each word having a number of bits corresponding to the number of output bits.

In block 140, each of n−2 data file parts of the n−1 data file parts and the deranged first data file result are combined by XOR to obtain second data file results. In more detail, n−2 data file parts are selected from the n−1 data file parts, and for each of the n−2 data file parts selected, block 140 is performed. Thus, n−2 second data file results are obtained.

In the above example, one of the two data file parts, i.e., either the first data file part "10011100" or the second data file part "01101100", and the deranged first data file result "11100001" are combined by XOR. That is, if the first data file part "10011100" is selected, the second data file result "01111101" will be obtained.

In case the number of the data storages is five, i.e., n=5, and thus the number of data file parts in which the data file is divided in block 110 is four, n−1=4, combining of block 140 is performed three times. That is, three data file parts among the four data file parts are selected, and each of them is combined with the deranged first data file result. Assuming that the data file parts are designated first to fourth data file parts, the first, second, and fourth data file parts and thus a number of three data file parts is selected, for example. Then, the first data file part is combined with the deranged first data file result, resulting in one second data file result, the second data file part is combined with the deranged first data file result, resulting in another second data file result, and the fourth data file part is combined with the deranged first data file result, resulting in yet another second data file result. In sum, three and thus n−2 second data file results are obtained, in block 140.

In block 150, the first data file result and the second data file results are combined by XOR to obtain a third data file result. Taking the above example with three data storages, the first data file result "11110000" and the second data file result "01111101" is combined by XOR, resulting in the third data file result "10001101". If the number of data storages is five, as exemplified above, the first data file result is combined with all three second data file parts to obtain the third data file part.

Finally, in block 160, the first, second and third data file results are stored in the number of data storages. As it will be appreciated by one of ordinary skill, the number of data file results corresponds to the number of data storages, namely one first data file result, a number of second data file results corresponding to the number of data storages minus two, and one third data file result. In case the data file is divided into a multiple of n−1 data file parts, the number of data file results multiplies in number by said multiple. That is, the number of each of the first, second and third data file parts multiplies in number by said multiple. For example, if the multiple is 3, the following data file results will be generated: 3 first data file results, 3*(n−2) second data file results and 3 third data file results. Each of the data file results is stored on one of the data storages.

In one example, storing the data file results in the data storages is performed according to a predefined scheme. That is, it is predefined that the first, second and third data file results are stored, in a reverse order, in the data storages. In addition, the predefined scheme may be altered between two data files to be stored. Alternatively, information may be generated and stored in one of the data storages, indicating in which of the data storages each of the data file results has been stored.

Figure 2:
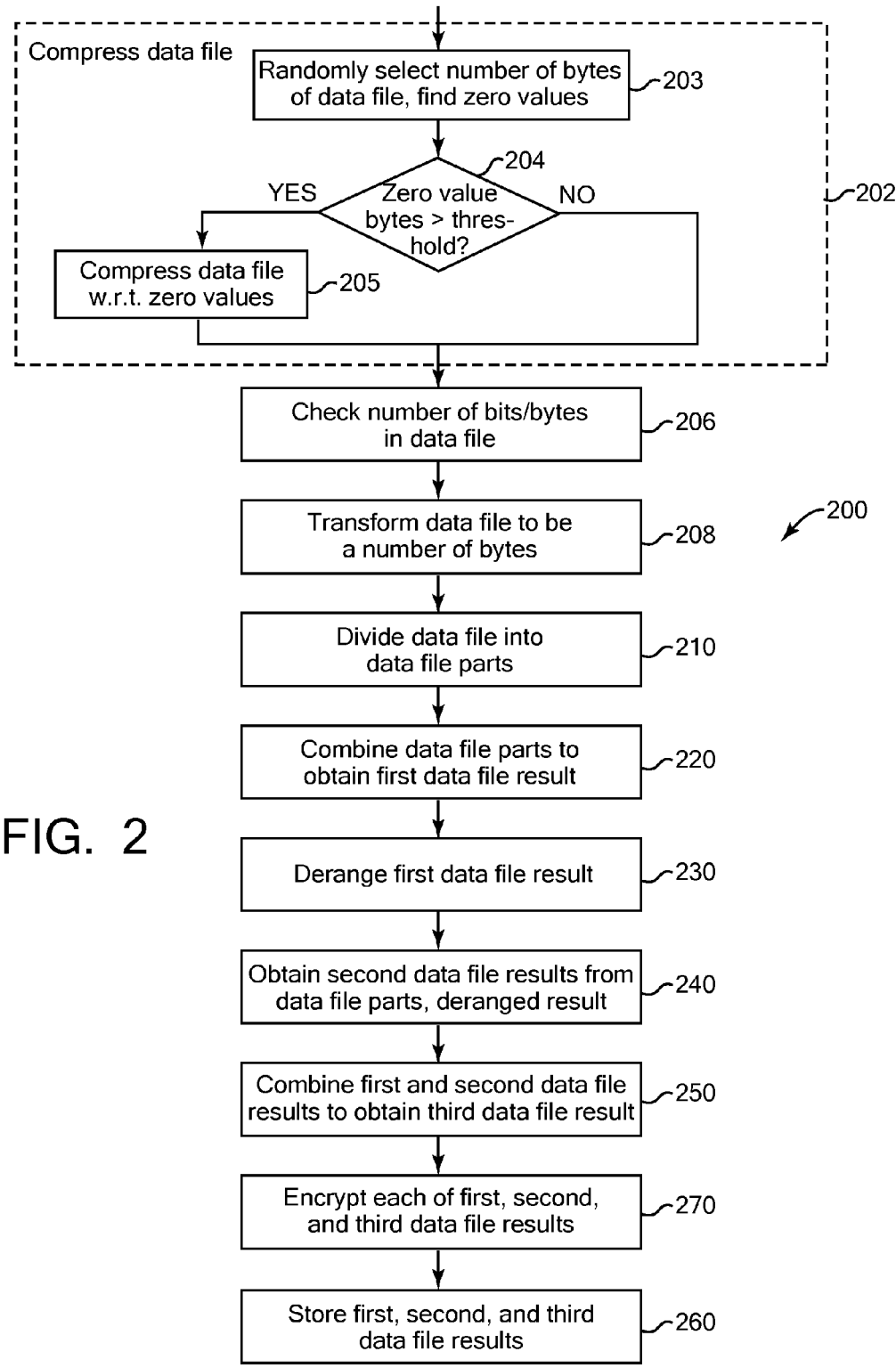
FIG. 2 is a flow chart of another example method for storing a data file in a number of data storages, in accordance with some implementations.

Referring now to FIG. 2, another example implementation will be described. In FIG. 2, a flow chart of a method 200 for storing a data file in a number of data storages is illustrated. The method 200 comprises the blocks 210 to 260 respectively corresponding to the blocks 110 to 160 shown in FIG. 1. Therefore, detailed description of blocks 210 to 260 is omitted.

The method 200 may further comprise the block 206 of checking whether a number of bytes or bits in the data file is a multiple of n−1, i.e., the number of data storages minus one, and the block 208 of transforming the data file such that the number of byte is a multiple of n−1. The blocks 206 and 208 are preferably performed prior to block 210. Furthermore, block 208 is performed only if the number of bytes or bits in the data file is not a multiple of n−1. As will be appreciated by one of ordinary skill, the data file will be modified in the transforming of block 208 in a manner such that its number of bytes or bits, after transforming, corresponds to a multiple of n−1. In the above example of five data storages, it may be checked whether the number of bytes of the data file is a multiple of four, i.e., n−1. So, if the data file only has 10 bytes, transforming the data file in block 208 will be performed. Otherwise, the method 200 proceeds with block 210 by taking the data file as it is.

One example of transforming is adding a number of bytes or bits to the data file until the number of bytes or bits of the data file is a multiple of n−1. That is, bytes or bits may be appended, one-by-one, at the end of the data file until the number of bytes or bits is a multiple of the number of data storages minus one. The transforming further may comprise generating information indicating the number of bytes or bits added, and which bytes or bits. This information is necessary to remove the bytes or bits added when recovering the data file. The information may be stored together with the first, second and third data file results in one of the data storages, or may be stored separately. Furthermore, the information may be generated so as to further indicate the number of bytes or bits of the data file before transforming. According to one example, a number of bytes or bits may be added to the data file, in addition to the number of bytes or bits to be added until the number of bytes or bits of the data file is the multiple of n−1. The number of bytes or bits generally to be added may be predefined. It further may be predefined which bytes or bits, i.e., which value, and/or where these bytes or bits, e.g., at the end of the data file, are to be added generally. Thus, the transformed data file comprises the data file, the number of bytes or bits generally added, and the number of bytes or bits added until number of bytes or bits of the transformed data file is the multiple of n−1. However, as will be appreciated by one of ordinary skill, other methods for transforming may be applied as far as the number of bytes or bits of the data file is a multiple of n−1, after transforming the same.

Also, the method 200 may, alternatively or additionally, comprise the block 202 of compressing the data file before dividing in block 210. Compressing can be either lossy or lossless; however, in any case, the size of the data file is reduced. Lossless compression reduces bits by identifying and eliminating statistical redundancy without losing information, whereas lossy compression reduces bits by identifying unnecessary information and removing it. However, as will be appreciated by one of ordinary skill, lossy compression may be suitable in a particular case only, e.g., when the data file to be stored is an image or sound file or the like and the image or sound file is used as it is. Preferably, compressing in block 202 is lossless. That is, the size of the data file is reduced in block 202 without losing information.

In one example, compressing the data file in block 202 may comprise block 203 of randomly selecting a predetermined number of bytes from the data file and determining a number of bytes having a value of zero among the predetermined number of bytes selected, block 204 of checking if the number of bytes having a value of zero exceeds a predetermined threshold value, and block 205 of compressing the data file with respect to bytes of the data file having a value of zero. For example, in block 203, a predetermined number of 10 bytes is randomly selected from a data file having a size of 20 bytes and it is determined whether and which of the 10 bytes randomly selected from the data file has a value of zero, i.e., "00000000". If in block 204 the number of bytes having a value of zero exceeds a predetermined threshold value, e.g., 7 bytes, the data file will be compressed in block 205 with respect to bytes of the data file having a size of zero.

The method 200 may, alternatively or additionally, further comprise the block of encrypting the data file (not shown) and/or the block 270 of encrypting each of the first, second and third data file results with an encryption algorithm. Encryption algorithms are known. Preferably, the encryption algorithm is a symmetric key encryption algorithm, i.e., the encryption and decryption keys are the same.

In one example, the data file results are encrypted before storing the same. One or more keys for the encryption algorithm can be a global key valid for each data file to be stored, or individual keys for each of the data file results. The individual keys may, for example, be keys corresponding to the data storage on which the respective data file result is stored.

Figure 3:
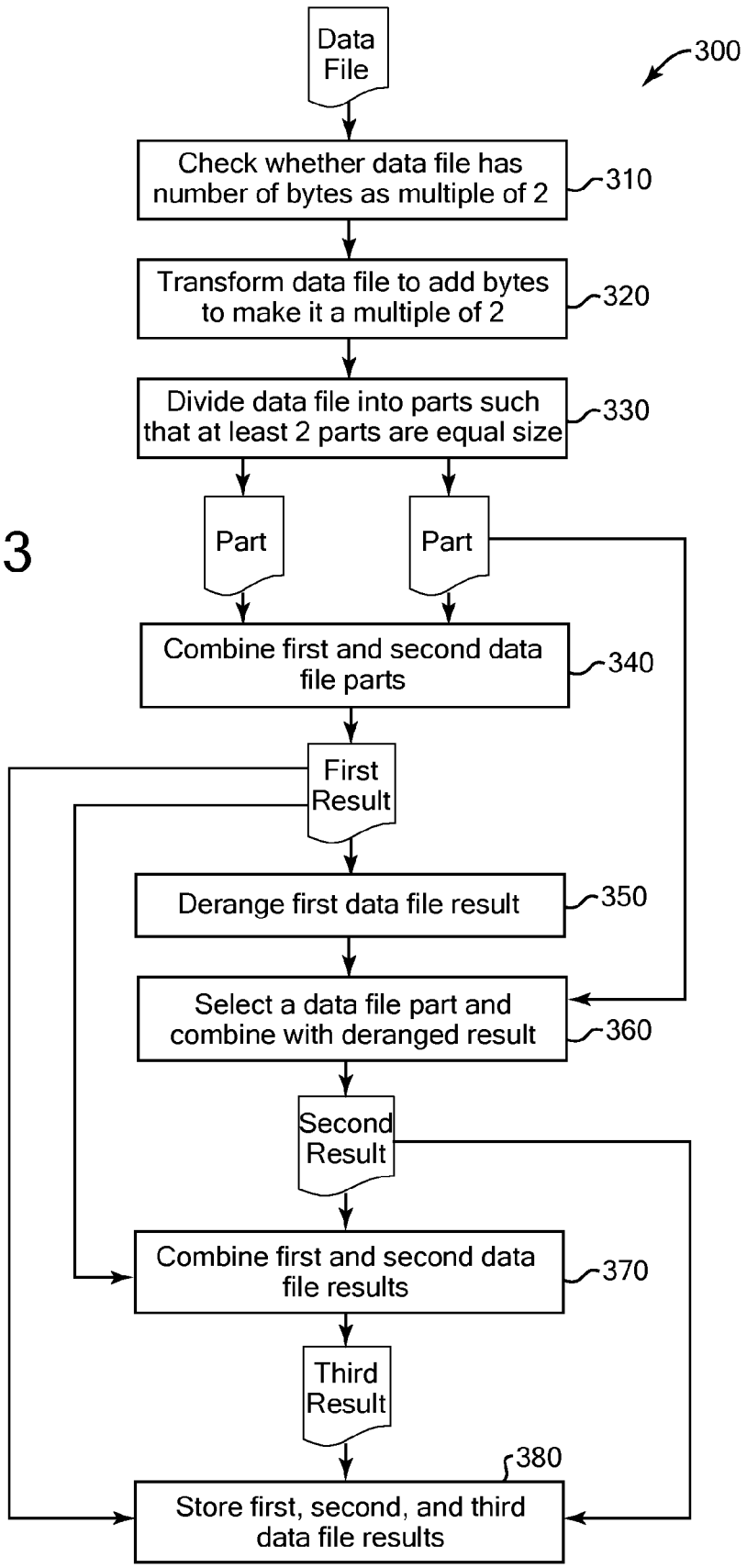
FIG. 3 illustrates an example of the method according to an implementation where the number of data storages is three.

Now, an example 300 of storing a data file in three data storages, i.e., n=3, will be described with reference to FIG. 3. The data file is considered to have the following bytes sequence: "10011100 01101100 11110010 00010100 10101010". That is, the data file comprises 5 bytes.

Starting with block 310, it is checked whether the data file has a number of bytes being a multiple of 2, i.e., n−1. In this example, the data file comprises 5 bytes which is not a multiple of 2. The data file therefore is transformed in block 320, e.g., by adding bytes, such that the number of bytes is a multiple of n−1. After adding one byte, e.g., by appending the same at the end of the data file, the number of bytes of the data file is a multiple of 2. For simplification purposes, it is to be noted that a byte is appended having a value of zero, i.e., "00000000", in this example. However, as it will be appreciated by one of ordinary skill, the bytes to be added may have any value. In particular, the value of the bytes to be added preferably is not zero, i.e., not "00000000". So, the byte sequence of the data file is "10011100 01101100 11110010 00010100 10101010 00000000".

Then, in block 330, the data file will be divided into a plurality of data file parts such that at least two, i.e., n−1, data file parts are equal in size. In the present example, the data file is to be divided into two data file parts, designated first and second data file parts, each having a size of three bytes. Consequently, the first data file part is "10011100 01101100 11110010" and the second data file part is "00010100 10101010 00000000".

In block 340, the first data file part and the second data file part are combined by XOR. As a result, a first data file result "10001000 11000110 11110010" is obtained.

The first data file result then is deranged, e.g., bit rotated by one bit to the left, in block 350 and a deranged first data file result "00010001 10001101 11100101" is obtained.

In block 360, one of the two data file parts is selected and combined with the deranged first data file result. For example, the second data file part may be selected. After combining the same with the deranged first data file result, a second data file result of "00000101 00100111 11100101" is obtained.

The above first and second data file results are combined in block 370 to obtain a third data file result. In the present example, the third data file result of "10001101 11100001 00010111" is obtained.

Finally, in block 380, the first, second, and third data file result is stored one of the three data storages.

Figure 4:
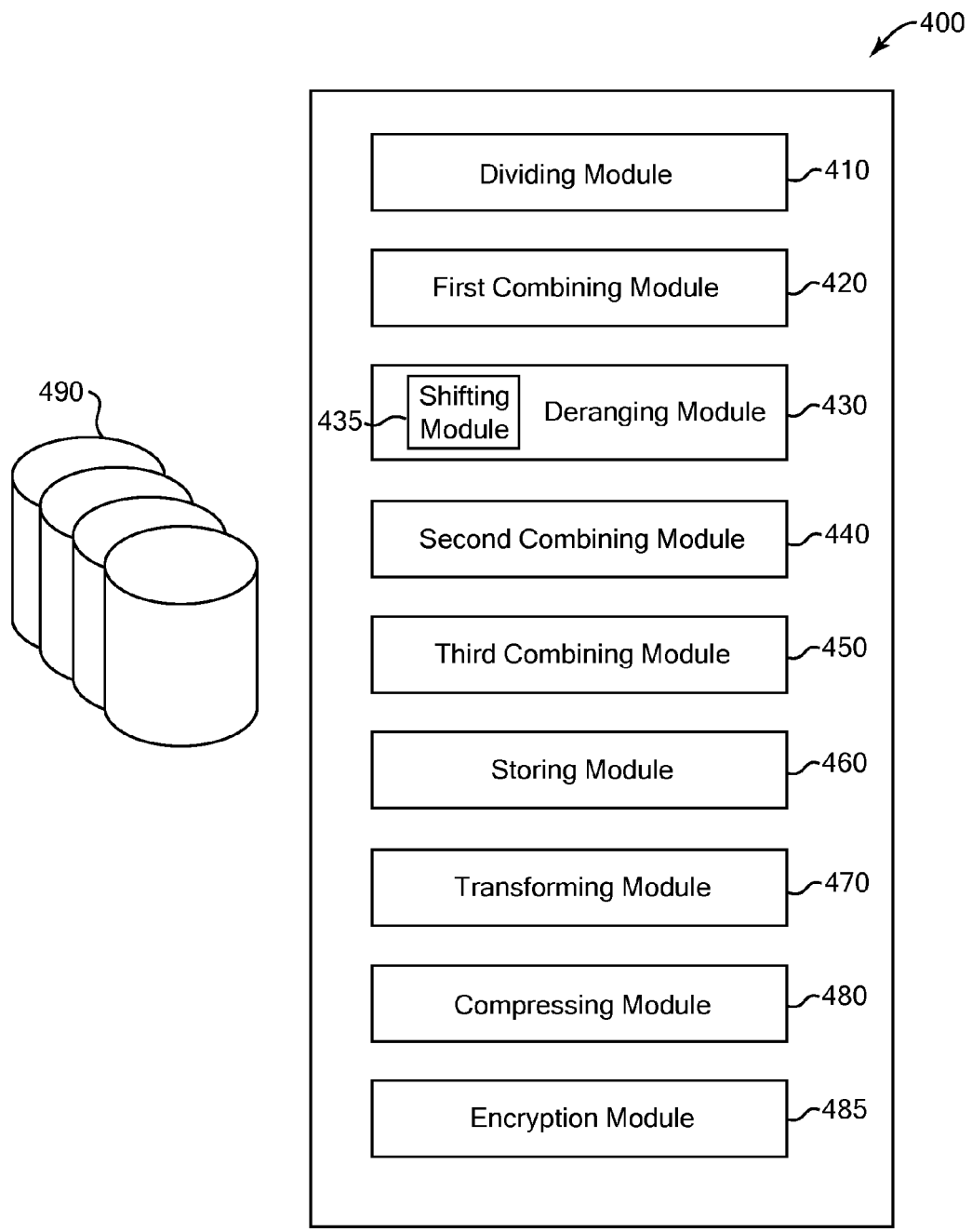
FIG. 4 illustrates a configuration of an apparatus for storing a data file in a number of data storages, in accordance with some implementations.

In FIG. 4, a configuration of an apparatus 400 for storing a data file in a number of data storages 490, in accordance with an exemplary embodiment of the present invention is illustrated and will be described hereinforth. The number of data storages is n and n is an integer equal to or greater than three.

The apparatus comprises dividing module 410 for dividing the data file into a plurality of data file parts such that at least n−1 data file parts of the plurality of data file parts are equal in size, first combining module 420 for combining the n−1 data file parts by XOR to obtain a first data file result, deranging module 430 for deranging the first data file result to obtain a deranged first data file result, second combining module 440 for combining each of n−2 data file parts of the n−1 data file parts and the deranged first data file result by XOR to obtain second data file results, third combining module 450 for combining the first data file result and the second data file results by XOR to obtain a third data file result, and storing module 460 for storing each of the first, second and third data file results in one of the n data storages 490.

In one example, the apparatus 400 further comprises transforming module 470 for checking whether a number of bytes in the data file is a multiple of n−1 and if not, transforming the data file such that the number of byte is a multiple of n−1. The transforming module 470 may further be configured to add bytes to the data file until the number of bytes is a multiple of n−1.

The apparatus 400 may, alternatively or additionally, further comprises compressing module 480 for compressing the data file. The compressing module 480 may be configured to randomly select a predetermined number of bytes from the data file, determine a number of bytes having a value of zero among the predetermined number of bytes, and if the number of bytes having a value of zero exceeds a predetermined threshold value, compress the data file with respect to bytes of the data file having a value of zero.

In another example, the apparatus 400 may further comprises encryption module 485 for encrypting the data file and/or each of the first, second and third data file results with an encryption algorithm.

The deranging module 430 may comprise shifting module 435 for shifting the first data file result by a predetermined number of bits.

One or more devices may be used to implement one or more features described herein. An implementing device can be any suitable computer system, server, or other electronic or hardware device. For example, the device can be a mainframe computer, desktop computer, workstation, portable computer, or electronic device (portable device, cell phone, smart phone, tablet computer, television, TV set top box, personal digital assistant (PDA), media player, game device, etc.). In some implementations, the device includes a processor, a memory, and input/output (I/O) interface.

The processor can be one or more processors or processing circuits to execute program code and control basic operations of the device. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

The memory is typically provided in the device for access by the processor, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from the processor and/or integrated therewith. The memory can store software operating on the device by the processor, including an operating system and one or more applications. In some implementations, the applications can include instructions that enable the processor to perform the functions described herein, e.g., some or all of the methods described herein. Any of software in the memory can alternatively be stored on any other suitable storage location or computer-readable medium. In addition, the memory and/or other connected storage device(s) can store data used in the features described herein. The memory and any other type of storage (magnetic disk, optical disk, magnetic tape, or other tangible media) can be considered "storage devices."

The I/O interface can provide functions to enable interfacing the device with other systems and devices. For example, network communication devices, storage devices such as memory and/or one or more databases, and input/output devices can communicate via the I/O interface. In some implementations, the I/O interface can connect to interface devices such as input devices (keyboard, pointing device, touchscreen, microphone, camera, scanner, etc.) and output devices (display device, speaker devices, printer, motor, etc.).

According to yet another embodiment of the present invention, a computer program which can be executed on a computer and comprises instructions executable by the computer is provided. The computer program causes the computer when being executed by the same to perform the method 100 or 200 as described above. The computer program may be stored on a non-transitory computer-readable recording medium.

Furthermore, as it will be appreciated by one of ordinary skill, to recover the data file from the first, second, and third data file results stored in the data storages, the method as, e.g., shown in FIGS. 1 and 2 and described above, is to be performed reversely.

The various aspects, features, embodiments or implementations of the present invention described above can be used alone or in various combinations. Note that the functional blocks, features, methods, devices, and systems described in the present disclosure may be integrated or divided into different combinations of systems, devices, and functional blocks as would be known to those skilled in the art. In some implementations, methods can be implemented, for example, on a server system. In other implementations, some or all of the methods can be implemented on a system such as one or more client devices, and/or on both a server system and a client system. In some implementations, different components of one or more servers and/or clients can perform different blocks or other parts of the methods.

The described features can be implemented by software, but can also be implemented in hardware or a combination of hardware and software. The described features can also be embodied as computer-readable code on a computer-readable medium. The code can be executed on a computer, e.g., implemented by one or more processors, such as microprocessors or other processing circuitry. The computer-readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer-readable medium can also be distributed over network-coupled computer systems so that the computer readable code is stored and executed in a distributed fashion.

Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

While features have been described in terms of several preferred implementations, there are alterations, permutations, and equivalents, which fall within the scope of described features.

It should also be noted that there are many alternative ways of implementing the methods and apparatuses of the described features.

It is therefore intended that the following appended claims be interpreted as including all such alterations, permutations, and equivalents as fall within the scope of the described features as defined by the appended claims.

What is claimed is:

1. A method for storing a data file in n different data storages, n being an integer equal to or greater than 3, the method comprising:
   dividing the data file into n−1 data file parts that are equal in size;
   combining the n−1 data file parts by XOR to obtain a first data file result;
   deranging the first data file result to obtain a deranged first data file result;
   individually combining each of n−2 data file parts of the n−1 data file parts and the deranged first data file result by XOR to obtain n−2 second data file results, wherein one part of the n−1 data file parts is excluded from the combining;
   combining the first data file result and the n−2 second data file results by XOR to obtain a third data file result; and
   storing the first data file result, each of the n−2 second data file results, and the third data file result in a different one of the n data storages according to a predefined scheme that defines an order in which the first data file result, each of the n−2 second data file results, and the third data file result are stored in the n data storages.

2. The method according to claim 1, further comprising, before the dividing, checking whether a number of bytes in the data file is a multiple of n−1 and if not, transforming the data file such that the number of bytes is a multiple of n−1.

3. The method according to claim 2, wherein the transforming the data file includes adding bytes to the data file until the number of bytes is a multiple of n−1.

4. The method according to claim 1, further comprising, before the dividing, compressing the data file.

5. The method according to claim 4, wherein the compressing the data file comprises:
randomly selecting a predetermined number of bytes from the data file;
determining a number of bytes having a value of zero among the predetermined number of bytes; and
if the number of bytes having a value of zero exceeds a predetermined threshold value, compressing the data file with respect to bytes of the data file having a value of zero.

6. The method according to claim 1, wherein deranging the first data file result comprises shifting the first data file result by a predetermined number of bits.

7. The method according to claim 1, further comprising encrypting one or more of the data file and each of the first data file result, the n−2 second data file results, and the third data file result with an encryption algorithm.

8. An apparatus for storing a data file in n different data storages, n being an integer equal to or greater than 3, the apparatus comprising:
a dividing module configured to divide the data file into n−1 data file parts that are equal in size;
a first combining module configured to combine the n−1 data file parts by XOR to obtain a first data file result;
a deranging module configured to derange the first data file result to obtain a deranged first data file result;
a second combining module configured to individually combine each of n−2 data file parts of the n−1 data file parts and the deranged first data file result by XOR to obtain n−2 second data file results, wherein one part of the n−1 data file parts is excluded from the combining;
a third combining module configured to combine the first data file result and the n−2 second data file results by XOR to obtain a third data file result; and
a storing module configured to store the first data file result, each of the n−2 second data file results, and the third data file result in a different one of the n data storages according to a predefined scheme that defines an order in which the first data file result, each of the n−2 second data file results, and the third data file result are stored in the n data storages.

9. The apparatus according to claim 8, further comprising a transforming module configured to check whether a number of bytes in the data file is a multiple of n−1 and if not, transform the data file such that the number of bytes is a multiple of n−1.

10. The apparatus according to claim 9, wherein the transforming module is further configured to add bytes to the data file until the number of bytes is a multiple of n−1.

11. The apparatus according to claim 8, further comprising a compressing module configured to compress the data file.

12. The apparatus according to claim 11, wherein the compressing module is configured to:
randomly select a predetermined number of bytes from the data file;
determine a number of bytes having a value of zero among the predetermined number of bytes; and
if the number of bytes having a value of zero exceeds a predetermined threshold value, compress the data file with respect to bytes of the data file having a value of zero.

13. The apparatus according to claim 8, wherein the deranging module comprises at least one of:
a shifting module configured to shift the first data file result by a predetermined number of bits; and
an encryption module configured to encrypt one or more of the data file, and each of the first data file result, one or more of the second data file results, and the third data file result with an encryption algorithm.

14. A non-transitory computer-readable recording medium on which computer program code is stored, the computer program code which when executed on a computer enabling the computer to perform operations including:
dividing a data file into n−1 data file parts that are equal in size;
combining the n−1 data file parts by XOR to obtain a first data file result;
deranging the first data file result to obtain a deranged first data file result;
individually combining each of n−2 data file parts of the n−1 data file parts and the deranged first data file result by XOR to obtain n−2 second data file results, wherein one part of the n−1 data file parts is excluded from the combining;
combining the first data file result and the n−2 second data file results by XOR to obtain a third data file result; and
storing the first data file result, each of the n−2 second data file results, and the third data file result in a different one of n data storages according to a predefined scheme that defines an order in which the first data file result, each of the n−2 second data file results, and the third data file result are stored in the n data storages.

15. The computer-readable recording medium according to claim 14, further comprising, before the dividing, checking whether a number of bytes in the data file is a multiple of n−1 and if not, transforming the data file such that the number of bytes is a multiple of n−1.

16. The computer-readable recording medium according to claim 15, wherein transforming the data file includes adding bytes to the data file until the number of bytes is a multiple of n−1.

17. The computer-readable recording medium according to claim 14, further comprising, before the dividing, compressing the data file.

18. The computer-readable recording medium according to claim 17, wherein the compressing the data file comprises:
randomly selecting a predetermined number of bytes from the data file;
determining a number of bytes having a value of zero among the predetermined number of bytes; and
if the number of bytes having a value of zero exceeds a predetermined threshold value, compressing the data file with respect to bytes of the data file having a value of zero.

19. The computer-readable recording medium according to claim 14, wherein deranging the first data file result comprises shifting the first data file result by a predetermined number of bits.

20. The computer-readable recording medium according to claim 14, further comprising encrypting one or more of the data file, and each of the first data file result, one or more of the second data file results, and the third data file result with an encryption algorithm.

\* \* \* \* \*